US008737543B2

(12) United States Patent
Park et al.

(10) Patent No.: US 8,737,543 B2
(45) Date of Patent: May 27, 2014

(54) METHOD AND APPARATUS FOR RECOVERING ESTIMATED VELOCITY OF MOBILE STATION IN COMMUNICATION SYSTEM (75) Inventors: Min-Cheol Park, Suwon-si (KR); In-Hyoung Kim, Yongin-si (KR); Tae-Gon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 722 days.

(21) Appl. No.: 12/910,103

(22) Filed: Oct. 22, 2010

(65) Prior Publication Data
US 2011/0098073 A1   Apr. 28, 2011

(30) Foreign Application Priority Data
Oct. 22, 2009   (KR) ......................... 10-2009-0100815

(51) Int. Cl.
H03D 1/00   (2006.01)
(52) U.S. Cl.
USPC .......................................................... 375/343
(58) Field of Classification Search
USPC ......... 375/148, 224, 260, 267, 343, 344, 346, 375/347
See application file for complete search history.

(56) References Cited
U.S. PATENT DOCUMENTS

| 2004/0190657 | A1* | 9/2004 | Seki et al. | 375/347 |
| 2009/0168930 | A1* | 7/2009 | Li et al. | 375/346 |
| 2010/0080178 | A1* | 4/2010 | Cox et al. | 370/329 |
| 2010/0158163 | A1* | 6/2010 | Wu et al. | 375/343 |

OTHER PUBLICATIONS

T.S. Rappaport, "Wireless Communications Principles and Practice: 2nd Edition", Chapter 5: Mobile Radio Propagation: Small-Scale Fading and Multipath as it applies to Modulation Techniques, Dec. 31, 2001.

* cited by examiner

Primary Examiner — Sam K Ahn
Assistant Examiner — Syed Haider
(74) Attorney, Agent, or Firm — Jefferson IP Law, LLP (57) ABSTRACT

A method and apparatus for recovering an estimated velocity of a mobile station in a communication system are provided. The apparatus includes a searcher for determining a Doppler shift value representing the estimated velocity of the mobile station by using a channel impulse response of a preamble signal received at a regular interval of time, a detector for determining a reference Doppler value for compensating the Doppler shift value by using correlation ratios between channel values of symbols to which data for the mobile station are allocated according to subcarriers in a data allocation field of a frame including the preamble signal, and a compensator for determining a compensated Doppler shift value by using the reference Doppler value to compensate the Doppler shift value for a folding value, wherein the folding value represents a difference between the estimated velocity and a true velocity of the mobile station.

13 Claims, 10 Drawing Sheets

METHOD AND APPARATUS FOR RECOVERING ESTIMATED VELOCITY OF MOBILE STATION IN COMMUNICATION SYSTEM

PRIORITY

This application claims the benefit under 35 U.S.C. §119(a) of a Korean patent application filed in the Korean Industrial Property Office on Oct. 22, 2009, and assigned Serial No. 10-2009-0100815, the entire disclosure of which is hereby incorporated by reference.

BACKGROUND OF THE INVENTION

1. Field of the Invention

The present invention relates to a method and apparatus for recovering the estimated velocity of a mobile station in a mobile communication system.

2. Description of the Related Art

In next generation wireless communication systems, resource allocation based on accurate channel information plays an important role in supporting large-capacity multimedia packet services with limited frequency resources. The moving velocity and velocity information of a mobile station are important factors of channel information for such resource allocation, and are utilized as important information for power and handoff control in a cellular communication system.

More specially, the moving velocity or Doppler information of a mobile station may be used in various applications. For example, the moving velocity or Doppler information of a mobile station is used as coherent time information for channel estimation or as feedback information for beamforming or channel precoding. Also, the moving velocity or Doppler information of a mobile station may be used as a measurement for effective resource allocation aimed at increasing available resources within a cell.

A mobile station experiences a fading effect and Doppler shift effect of a received signal. In a mobile communication system, the power of a transient signal received at an antenna of a receiver generally corresponds to a sum of signals received through multi-paths that are the result of scattering and reflecting of a signal transmitted from a transmitter to the receiver, and the received signals may be roughly divided into two components, that is, slow fading and fast fading. The slow fading is caused by terrain topography between a transmitter and a receiver, and receive power varies according to measurement locations. The fast fading is also referred to as "Rayleigh fading", and is caused by scattering and reflecting of a signal, resulting from obstacles on a transmission path, such as buildings, trees, and vehicles. In this way, due to the influences of the slow fading and the fast fading, the power of a signal received by a mobile station varies every moment.

The Doppler shift effect generates a frequency error in a received signal in proportion to the moving velocity of a mobile station with respect to a base station.

Thus, using this characteristic in which a frequency error in a received signal due to the Doppler shift effect is proportional to the moving velocity of a mobile station, it is possible to estimate the velocity of the mobile station. In other words, the velocity of the mobile station may be estimated by detecting the maximum Doppler frequency, that is, the Doppler shift, of a signal received from a base station in a mobile communication system.

Figure 1:
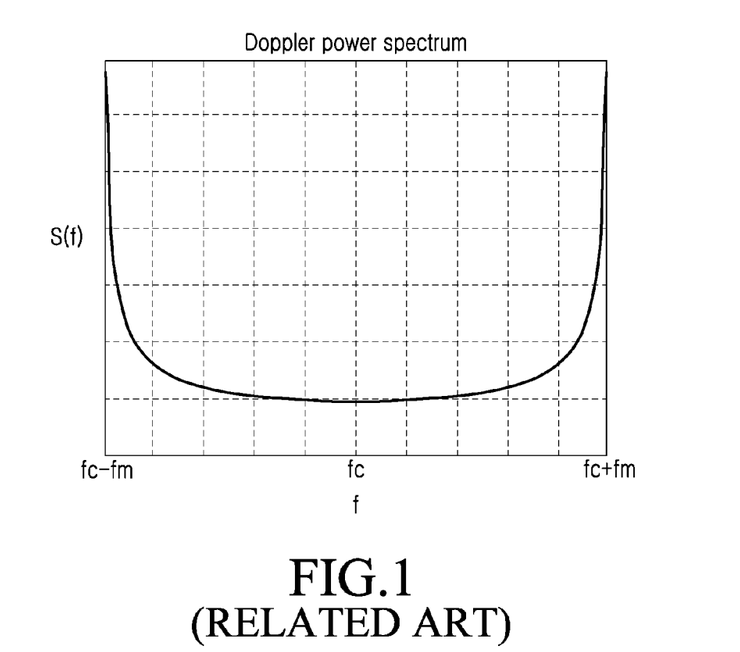
FIG. 1 is a graph illustrating a Doppler power spectrum of the related art.

The above-mentioned moving velocity or Doppler information of a mobile station may be represented by a typical Doppler power spectrum as illustrated in FIG. 1.

FIG. 1 is a graph illustrating a Doppler power spectrum of the related art.

Referring to FIG. 1, a Power Spectral Density (PSD) in the frequency domain is shown for a mobile station. The PSD is plotted within a range between two frequencies that are equidistant (the same frequency distance fm) left and right from the center frequency fc, that is, a range from fc+fm to fc−fm. Herein, the same frequency distance fm will be referred to as the "maximum Doppler shift". It can be noted that the PSD rapidly increases as the frequency becomes more distant from the center frequency in the left and right direction.

The PSD in the frequency domain, S(f), is expressed by the following equation:

$$S(f) = \frac{1.5}{\pi f_m \sqrt{1 - \left[\frac{f - f_c}{f_m}\right]^2}} \quad (1)$$

The PSD in the frequency domain can also be calculated as a frequency-domain value by using a channel impulse response as given in the following equation:

$$S(f) = FFT\{R_{hk}(-\tau)\} = FFT\{h^*(-\tau) \otimes h(\tau)\} = |H(f)|^2 \quad (2)$$

where, $R_{hk}(\tau)$ denotes the auto-correlation value of a corresponding channel, $h(\tau)$ and $H(f)$ denote channel responses in the time domain and the frequency domain respectively, $\otimes$ denotes the convolution operator, and FFT denotes the fast Fourier transform.

By obtaining a value of the maximum Doppler shift through Equations (1) and (2), the velocity of a mobile station can be calculated as given in the following equation:

$$v = \frac{c \cdot f_m}{f_c} \quad (3)$$

where, c is the velocity of light.

Figure 2:
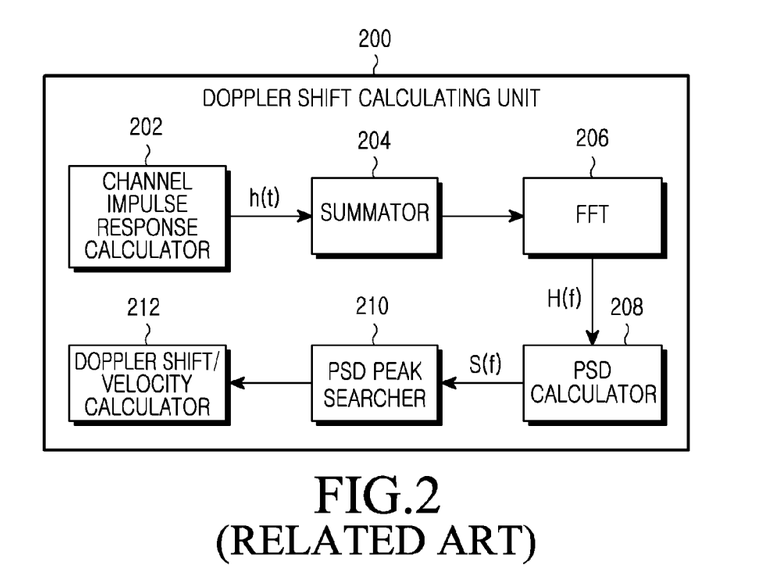
FIG. 2 illustrates a Doppler shift calculating unit provided in a mobile station of the related art.

In order to calculate the velocity of a mobile station, the mobile station includes a Doppler shift calculating unit configured as illustrated in FIG. 2.

FIG. 2 illustrates a Doppler shift calculating unit provided in a mobile station of the related art.

Referring to FIG. 2, the Doppler shift calculating unit 200 includes a channel impulse response calculator 202, a summator 204, a Fast Fourier Transformer (FFT) 206, a PSD calculator 208, a PSD peak searcher 210, and a Doppler/velocity calculator 212.

The channel impulse response calculator 202 obtains channel impulse response h(t) values according to multi-paths from a channel estimator (not shown), and delivers the obtained values to the summator 204. Here, h(t) is the channel impulse response of a received preamble signal.

The summator 204 obtains a summation value by summating the respective channel impulse response values obtained according to the multi-paths, and delivers the obtained summation value to the FFT 206. If respective PSDs are calculated for the multi-paths, then the summation operation of the summator 204 may be omitted.

The FFT 206 calculates H(f) values by performing a Fast Fourier Transform (FFT) operation for channel impulse response values at respective predetermined sampling points, and delivers the calculated H(f) values to the PSD calculator 208. The PSD calculator 208 calculates PSD values by squaring the respective H(f) values, the number of which corresponds to that of the sampling points, and delivers the calculated PSD values to the PSD peak searcher 210.

The PSD searcher 210 searches for a Doppler shift index having the maximum PSD value among the PSD values, the number of which corresponds to that of the sampling points, and converts the Doppler shift corresponding to the searched Doppler shift index into a Doppler shift/velocity value. The Doppler shift index will be described in more detail below.

Figure 3:
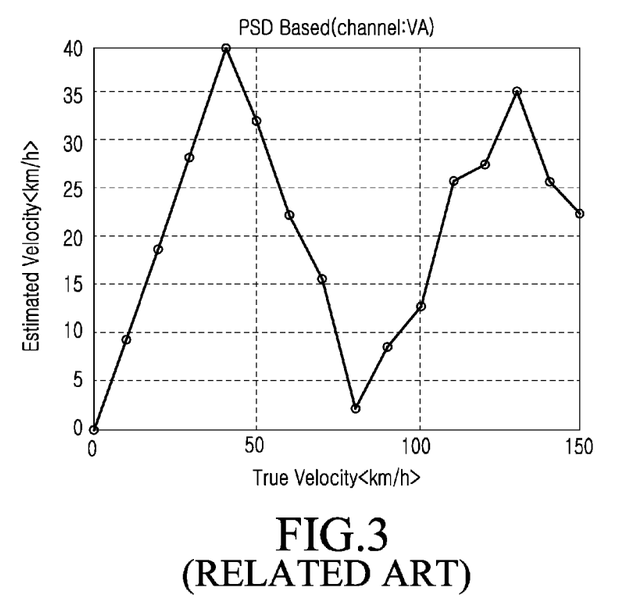
FIG. 3 illustrates a result of a simulation according to a method of the related art for estimating the velocity of a mobile station.

FIG. 3 illustrates a result of a simulation according to a method of the related art for estimating the velocity of a mobile station.

Referring to FIG. 3, the x-axis represents a true velocity, and the y-axis represents an estimated velocity. As an example, when a true velocity is equal to or greater than about 40 km/h, aliasing occurs due to an insufficient sampling rate. Thus, since the estimated velocity corresponding to a true velocity of 40 km/h or greater does not reach the actual velocity, the graph shows a folded shape at certain points (i.e., folding effect).

Generally, in order to calculate a PSD, a channel impulse response is obtained by estimating the channel of a preamble signal allocated in units of frames. As an example, the allocation period of the preamble signal is 5 msec as specified in the Institute of Electrical and Electronics Engineers (IEEE) standards 802.16e or 802.16m.

In this case, if the sampling theory defined by the following equation is applied, aliasing occurs when the Doppler shift has a value of 500 Hz or greater at a period of 5 msec:

$$f_s = \frac{1}{T_s} \geq 2 \cdot f_d \tag{4}$$

where, $f_s$ denotes a sampling frequency, $T_s$ denotes a sampling period, and $f_d$ denotes the Doppler shift.

That is, when the Doppler shift cannot satisfy the above condition as given in Equation (4), there is a problem in that the folding effect is caused by aliasing.

SUMMARY OF THE INVENTION

An aspect of the present invention is to address at least the above-mentioned problems and/or disadvantages and to provide at least the advantages described below. Accordingly, an aspect of the present invention is to provide a method and apparatus for compensating a frequency interval, in which the folding effect occurs in the Doppler shift, by using a reference Doppler value obtained through correlation ratios between symbols to which data are allocated according to subcarriers.

Another aspect of the present invention is to provide a method and apparatus for estimating a velocity close to the true velocity by obtaining estimatable ranges, that is, folding intervals, and compensating the Doppler shift within the folding intervals.

In accordance with an aspect of the present invention, an apparatus for recovering an estimated velocity of a mobile station in a communication system is provided. The apparatus includes a searcher for determining a Doppler shift value representing the estimated velocity of the mobile station by using a channel impulse response of a preamble signal received at a regular interval of time, a detector for determining a reference Doppler value for compensating the Doppler shift value by using correlation ratios between channel values of symbols to which data for the mobile station are allocated according to subcarriers in a data allocation field of a frame including the preamble signal, and a compensator for determining a compensated Doppler shift value by using the reference Doppler value to compensate the Doppler shift value for a folding value, wherein the folding value represents a difference between the estimated velocity and a true velocity of the mobile station.

In accordance with another aspect of the present invention, a method of recovering an estimated velocity of a mobile station in a communication system is provided. The method includes determining a Doppler shift value representing the estimated velocity of the mobile station by using a channel impulse response of a preamble signal received at a regular interval of time, determining a reference Doppler value for compensating the Doppler shift value by using correlation ratios between channel values of symbols to which data for the mobile station are allocated according to subcarriers in a data allocation field of a frame including the preamble signal, and determining a compensated Doppler shift value by using the reference Doppler value to compensate the Doppler shift value for a folding value, wherein the folding value represents a difference between the estimated velocity and a true velocity of the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for estimating the velocity of a mobile station as close to the true velocity as possible by determining the Doppler frequency shift through a preamble received during movement of a mobile station and compensating an interval where the folding effect occurs.

Figure 5:
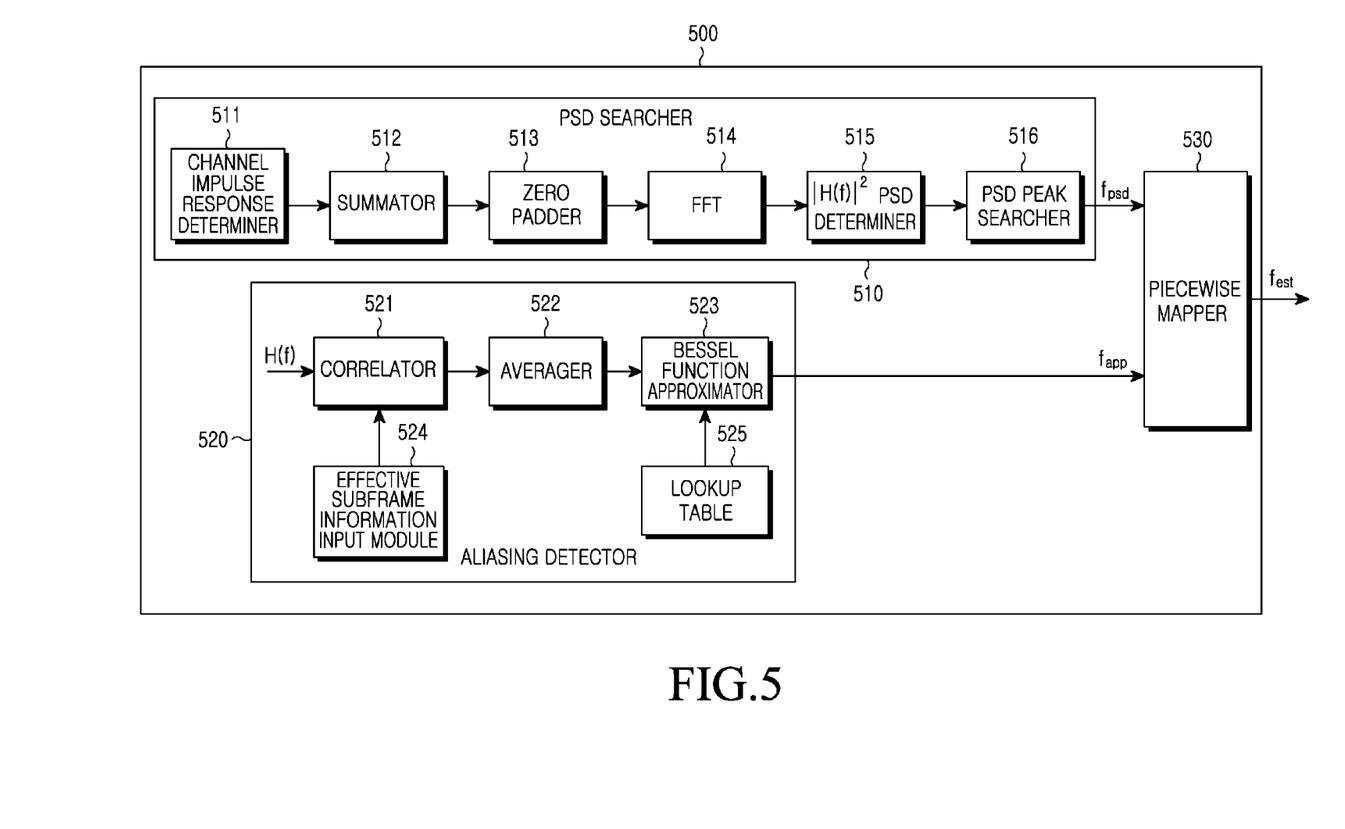
FIG. 5 illustrates a Doppler shift determining unit included in a mobile station according to an exemplary embodiment of the present invention.

FIG. 5 illustrates a Doppler shift determining unit included in a mobile station according to an exemplary embodiment of the present invention. Herein, constituent elements of the mobile station, which are irrelevant to the present invention, may obscure the gist of the present invention, so an illustration and description thereof will be omitted.

Referring to FIG. 5, the Doppler shift determining unit 500 includes a Power Spectral Density (PSD) searcher 510, an aliasing detector 520, and a piecewise mapper 530. Although a detailed structure of the PSD searcher 510 and the aliasing detector 5320 is illustrated in the drawing, it should be noted that the present invention is not limited to the illustrated structure.

First, in almost the same manner as the Doppler shift calculating unit 200 of FIG. 2, the PSD searcher 510 determines PSDs by using channel impulse responses as a result of channel estimation of a preamble signal received at a regular interval of time, obtains the Doppler shift $f_{psd}$ having the maximum PSD value among the determined PSDs, and outputs the obtained $f_{psd}$ to the piecewise mapper 530.

Next, the aliasing detector 520 determines a reference Doppler value $f_{app}$ that is an approximation of frequency-domain channel values of a data field signal within a frame including the preamble signal by use of the Bessel function, and outputs the determined $f_{app}$ to the piecewise mapper 530.

Finally, the piecewise mapper 530 determines a compensated Doppler shift value $f_{est}$ by compensating the reference Doppler value $f_{psd}$, determined in the PSD searcher 510, for a portion where the folding effect occurs, based on the $f_{app}$, and outputs the determined $f_{est}$.

Hereinafter, the operation of each of the PSD searcher 510, the aliasing detector 520, and the piecewise mapper 530 will be described in more detail with reference to the structural example illustrated in FIG. 5. However, it should be noted that the present invention is not limited to the structure illustrated in FIG. 5.

The PSD searcher 510 includes a channel impulse response determiner 511, a summator 512, a zero padder 513, an Fast Fourier Transformer (FFT) 514, a PSD determiner 515, and a PSD peak searcher 516. The channel impulse response determiner 511 samples a channel impulse response as a result of channel estimation of a preamble symbol interval on a frame-by-frame basis, and delivers the sampled channel impulse response to the summator 512. The sampled channel impulse response h(t) value is expressed by the following equation:

$$h(t) = \sum_{i=0}^{N-1} \alpha_i(t) e^{j\phi(t)} \delta(t - \tau_i(t)) \qquad (5)$$

where, $\alpha_i(t)$ and $\tau_i(t)$ denote magnitude and delay components of an ith multi-path respectively, i denotes a multi-path identifier, and $\phi(t)$ denotes a phase change value caused by the Doppler effect.

The summator 512 determines the summation value of magnitude components according to multi-paths b using the following equation, and delivers the determined summation value to the zero padder 513:

$$h_s(t) = \sum_{i=0}^{N-1} \alpha_i(t) e^{j\phi(t)} \qquad (6)$$

The zero padder 513 performs zero padding for components mismatched to the FFT size of the FFT 514 in the summation value, and the zero-padded summation value to the FFT 514. However, when the number of the sampled channel impulse response values is the same as the FFT size, the operation of the zero padder 513 may be omitted.

Figure 6:
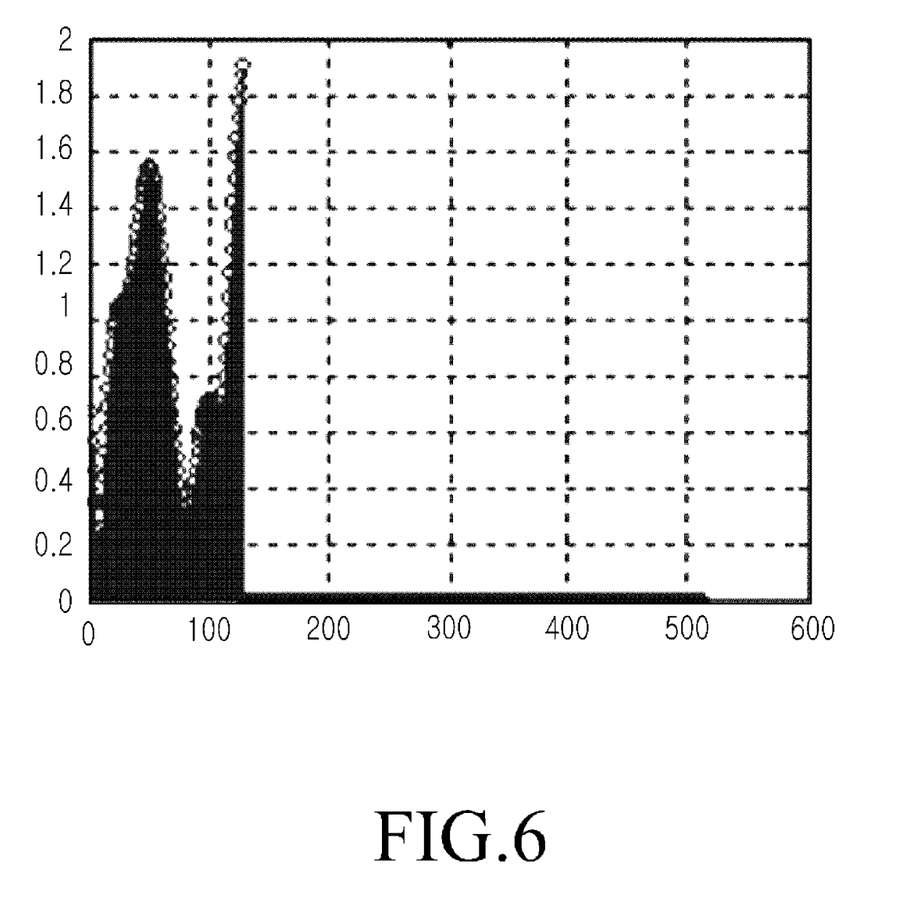
FIG. 6 is a graph illustrating an example of a result of performing zero padding for a summation value in a zero padder according to an exemplary embodiment of the present invention.

FIG. 6 is a graph illustrating an example of a result of performing zero padding for a summation value in a zero padder according to an exemplary embodiment of the present invention.

Referring to FIG. 6, the abscissa axis represents an FFT input index, and the ordinate axis represents a summation value at a corresponding FFT input index. For example, assuming that an FFT size is 512, and the number of sampled channel impulse response values is 128, the respective channel impulse response values are mapped to indexes 0 to 127 among input indexes corresponding to the FFT size, and a channel impulse response value of 0 is mapped to indexes 128 to 511.

The FFT 514 performs an FFT operation for the zero-padded summation value, and delivers the resultant value H(f) to the PSD determiner 515. The PSD determiner 515 determines $|H(f)|^2$, that is, a PSD value, by squaring the resultant value H(f), and delivers the determined PSD value to the PSD peak searcher 516.

Figure 7:
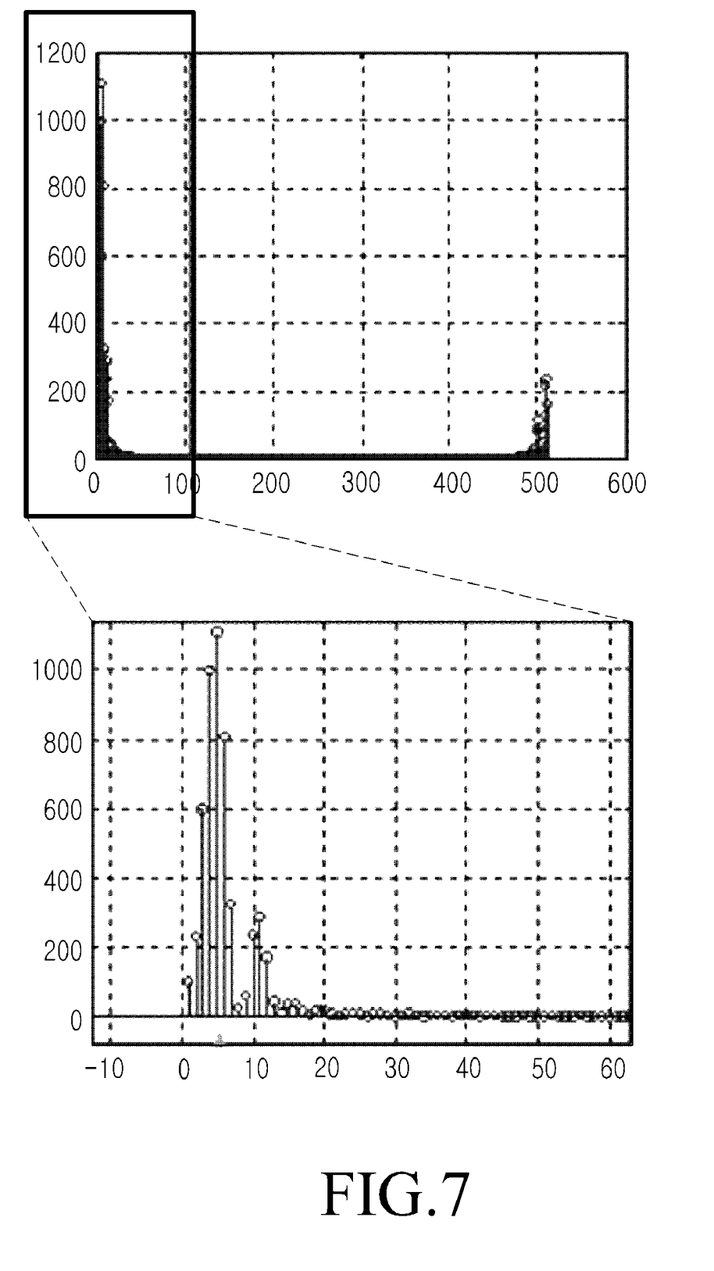
FIG. 7 is a graph illustrating a method to search for a maximum Power Spectral Density (PSD) value on a frequency-by-frequency basis according to an exemplary embodiment of the present invention.

FIG. 7 is a graph illustrating a method to search for a maximum PSD value on a frequency-by-frequency basis according to an exemplary embodiment of the present invention.

Referring to FIG. 7, the abscissa axis represents a Doppler shift index to which the Doppler shift is mapped, and the ordinate axis represents a PSD value.

The PSD peak searcher 516 previously recognizes Doppler shift indexes and Doppler shifts mapped thereto. That is, as illustrated in FIG. 1, index 0 is mapped to the center frequency, and a predetermined number of Doppler shift indexes are mapped to Doppler shifts at regular intervals from the center frequency.

The PSD peak searcher 516 searches for a Doppler shift index having the maximum PSD value among PSD values obtained in correspondence with the FFT size, searches for the Doppler shift $f_{psd}$ corresponding to the searched Doppler shift index, and outputs the searched $f_{psd}$ to the piecewise mapper 530.

The aliasing detector 520 includes a correlator 521, an averager 522, a Bessel function approximator 523, an effective subframe information input module 524, and a lookup table 525.

The correlator 521 receives input information on locations of effective subcarriers from the effective subframe information input module 524. Herein, an effective subcarrier denotes a resource carrying a symbol to which data available for velocity estimation is allocated.

Figure 8:
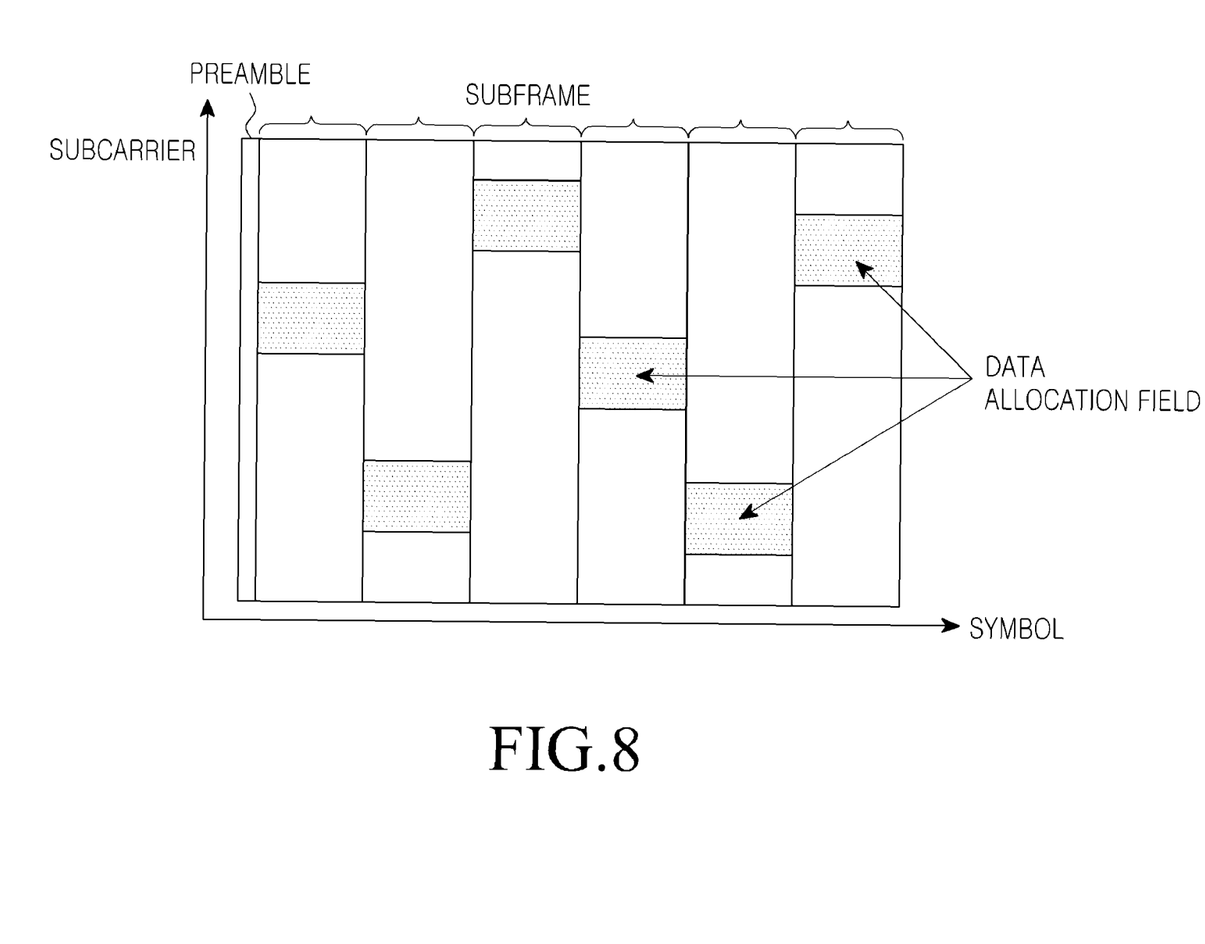
FIG. 8 is a view illustrating an example of information on locations of effective subcarriers in a frame according to an exemplary embodiment of the present invention.

FIG. 8 is a view illustrating an example of information on locations of effective subcarriers in a frame according to an exemplary embodiment of the present invention.

Referring to FIG. 8, the abscissa axis is the symbol axis, and the ordinate axis is the subcarrier axis. Shaded block areas denote locations of intervals in which data for a corresponding mobile station are allocated. That is, the information on locations of effective subcarriers may represent each interval in which data for a corresponding mobile station is allocated, in the form of an index indicating a corresponding symbol and a corresponding subcarrier respectively. However, it should be noted that the information on locations of effective subcarriers is not limited to such a form. By way of example, FIG. 8 shows a case where intervals with data allocated therein are discretely arranged on both the symbol and subcarrier axes. However, it is obvious that the intervals with data allocated therein may be continuously arranged on both the symbol and subcarrier axes.

Figure 9:
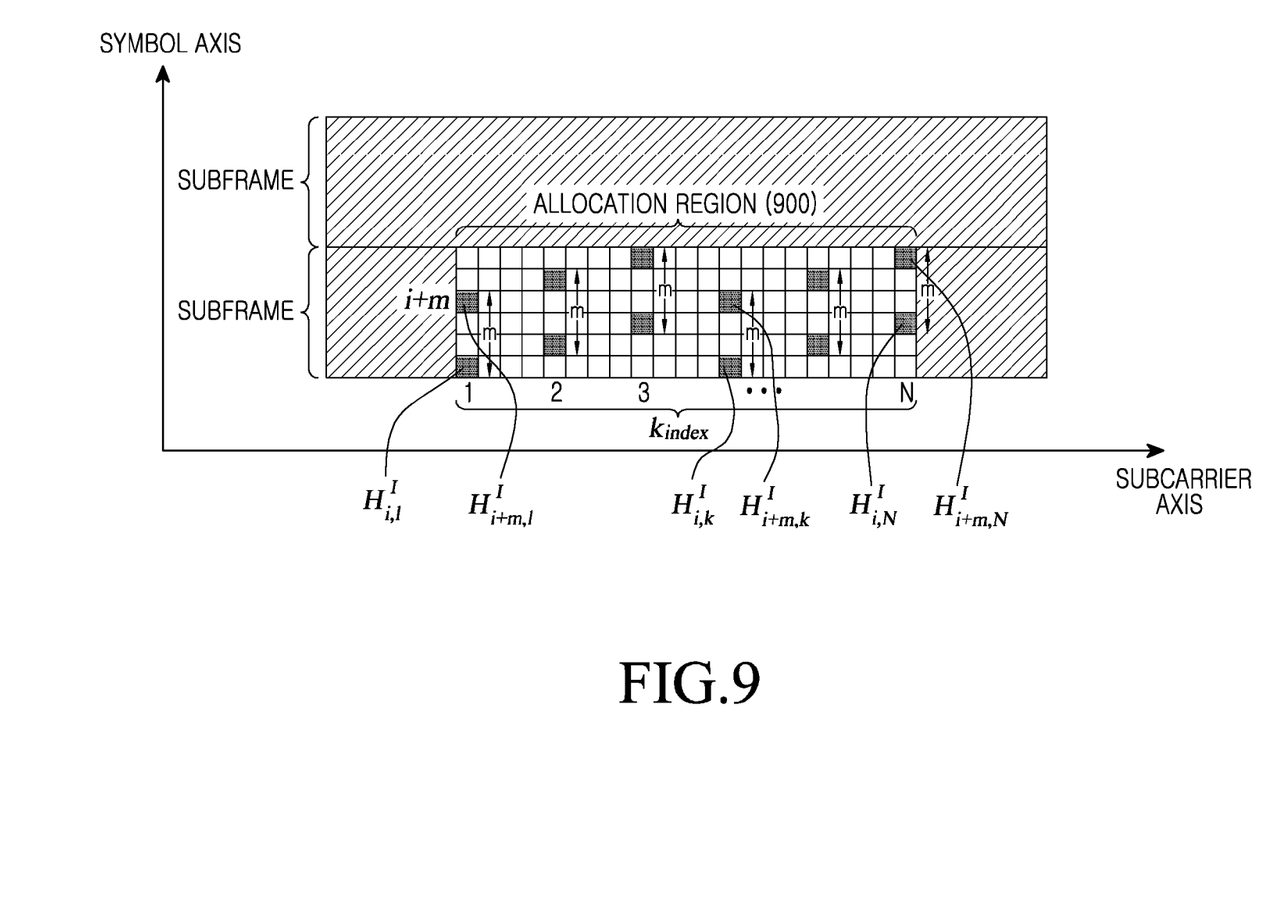
FIG. 9 is a view illustrating in more detail an example of information on locations of effective subcarriers in a frame according to an exemplary embodiment of the present invention.

FIG. 9 is a view illustrating in more detail an example of information on locations of effective subcarriers in a frame according to an exemplary embodiment of the present invention.

Referring to FIG. 9, the abscissa axis is the symbol axis, and the ordinate axis is the subcarrier axis. An area designated by oblique lines represents a field in which no data for a corresponding mobile station is allocated within a subframe band, and an allocation region 900 represents a field in which data are allocated. Each shaded block area in the allocation region 900 represents the location of a specific resource to which data is allocated. N denotes the number of effective subcarriers including the intervals with data allocated therein in the frequency domain, m denotes the number of symbols, which corresponds to a distance between symbols (inter-symbol distance) to which data are allocated in a corresponding effective subcarrier, k denotes a subcarrier index, and i denotes a symbol index. By way of example, FIG. 9 shows a case where all the inter-symbol distances on the subcarrier axis are constant as a value of m. Thus, a first symbol to which data is allocated in a corresponding subcarrier will be defined as an ith symbol, and a second symbol to which data is allocated in the corresponding subcarrier will be defined as an (i+m)th symbol.

Although this embodiment exemplifies a case where all the inter-symbol distances on the subcarrier axis are the same, it is obvious that the present invention may also be applied in the case of different inter-symbol distances.

The correlator 521 uses such information on locations of effective subcarriers to determine a correlation ratio between symbols, to which data are allocated in a corresponding effective subcarrier, on a subframe-by-subframe basis, and delivers the determined correlation ratio to the averager 522.

Figure 10:
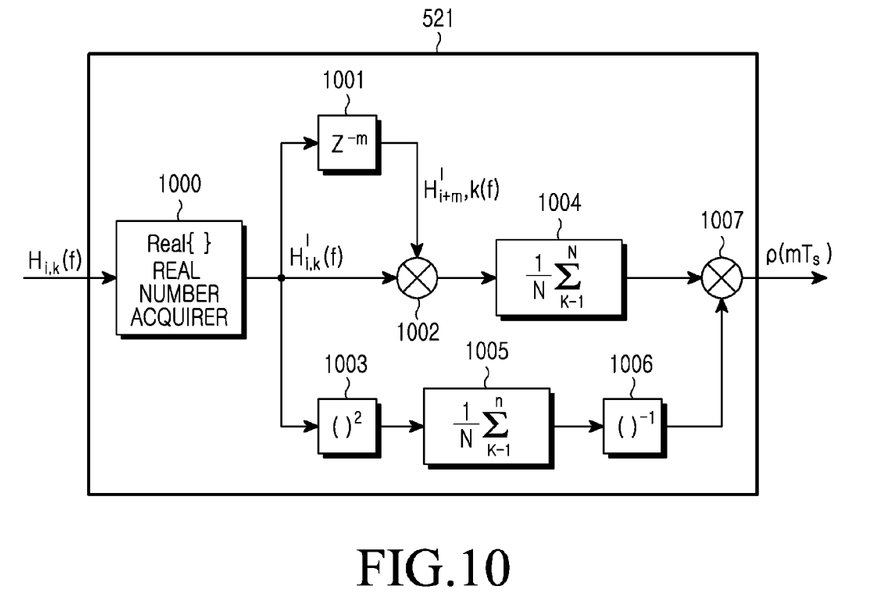
FIG. 10 is an operational block diagram of a correlator according to an exemplary embodiment of the present invention.

FIG. 10 is an operational block diagram of a correlator according to an exemplary embodiment of the present invention.

Referring to FIG. 10, the correlator 521 includes a real number acquirer 1000, a neighbor symbol determiner 1001, a first multiplier 1002, a squarer 1003, a first average function block 1004, a second average function block 1005, an inverse function block 1006, and a multiplier 1007. Although not shown in the drawing, each constituent element of the correlator 521 performs the following operation for each of effective subcarriers obtained through the effective subframe information input module 524.

On receiving input effective subcarrier location information as illustrated in FIG. 9 through the effective subframe information input module 524, the correlator 521 identifies locations of symbols to which data are allocated in a corresponding subcarrier interval, and determines a correlation ratio between the symbols with data allocated thereto by using the following equation:

$$\rho(mT_s) = \frac{\sum_{k=1}^{N} H_{i,k}^I \cdot H_{i+m,k}^I}{\sum_{k=1}^{N} (H_{i,k}^I)^2} \tag{7}$$

where, $H_{i,k}^I$ denotes the channel value of a real number part in an ith symbol and a kth subcarrier, and $T_s$ denotes an Orthogonal Frequency Division Multiplexing (OFDM) symbol period. By way of example, FIG. 10 exemplifies a case where data are allocated to two symbols according to subcarriers, but it is obvious that the present invention may also be applied when the number of symbols is two or more. Accordingly, it should be noted that the correlation ratio proposed in the present invention is not exclusively limited to Equation (7).

More specially, the real number acquirer 1000 separates an in-phase component, that is, a real number part $H_{i,k}^I$, from a frequency-domain channel value $H_{i,k}(f)$ at the location of an ith symbol and a kth subcarrier where data is allocated, and outputs the separated real number part $H_{i,k}^I$ to the neighbor symbol determiner 1001, the first multiplier 1002, and the squarer 1003.

The neighbor symbol determiner 1002 determines the channel value $H_{i+m,k}^I$ of a symbol with data allocated thereto, which is at a distance of m symbols from the symbol at the location of the ith symbol and the kth subcarrier, by using the real number part $H_{i,k}^I$, and delivers the determined $H_{i+m,k}^I$ to the first multiplier 1002. Then, the first multiplier 1002 multiplies $H_{i,k}^I$ and $H_{i+m,k}^I$, and delivers the resultant value to the average function block 1 1004. The average function block 1 1004 sums multiplication values of $H_{i,k}^{l}$ and $H_{i+m,k}^{l}$ for 1 to N and then divides the resultant summation value by N to thereby obtain an average value, and delivers the obtained average value as the numerator term of Equation (7) to the second multiplier 1007.

The squarer 1003 squares $H_{i,k}^{l}$, and delivers the square of $H_{i,k}^{l}$ to the second average function block 1005. The second average function block 1005 sums squares $|H_{i,k}^{l}|^2$ for 1 to N and then divides the resultant summation value by N to thereby obtain an average value, and delivers the obtained average value to the inverse function block 1006. The inverse function block 1006 obtains an inverse function value by taking the inverse function of the average value of the squares $|H_{i,k}^{l}|^2$, and delivers the obtained inverse function value as the denominator term of Equation (7) to the second multiplier 1007.

Subsequently, the correlation ratio between the symbols to which data are allocated in the corresponding subcarrier interval, as expressed by Equation (7), is output from the second multiplier 1007. Although this embodiment exemplifies a case where the correlation ratio is determined using only the real number part of a frequency-domain channel value, it is also possible to use an averaged correlation ratio obtained by determining a correlation ratio for the imaginary number part in the same manner and then averaging the correlation ratios for the real number and imaginary number parts.

Figure 11:
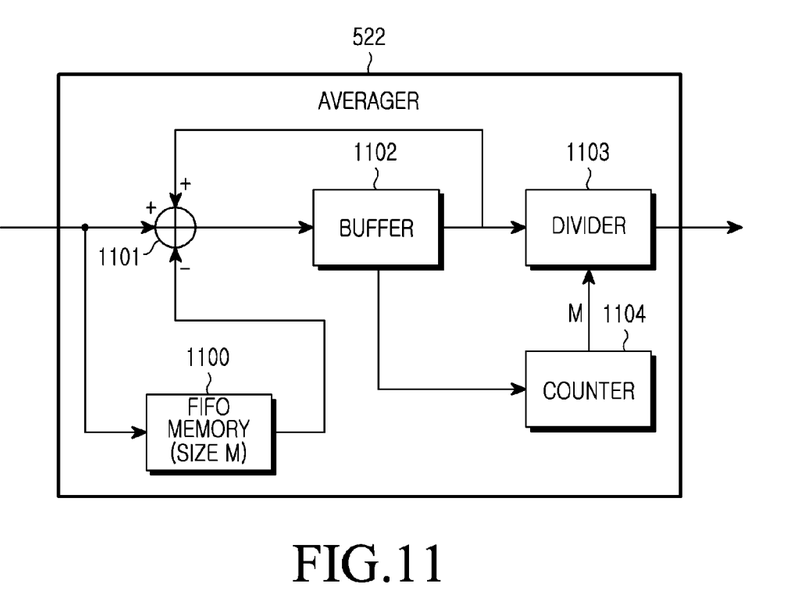
FIG. 11 illustrates an averager according to an exemplary embodiment of the present invention.

The averager 522 receives as many correlation ratios as an averaging window size, input from the correlator 521, and sums and averages the input correlation ratios in order to minimize a variation in the Doppler shift. The averaging window size may vary.

FIG. 11 illustrates an averager according to an exemplary embodiment of the present invention.

Referring to FIG. 11, the averager 522 includes a First Input First Output (FIFO) memory 1100, a summator 1101, a buffer 1102, a divider 1103, and a counter 1104.

If correlation ratios between symbols with data allocated thereto, determined according to Equation (7), are input according to subcarriers from the correlator 521, the input correlation ratios are accumulated through the summator 1101, and the summation thereof is delivered to the buffer 1102. The correlation ratios are also delivered to the FIFO memory 1100.

The buffer 1102 cumulatively stores as many correlation ratios as a predetermined averaging window size. With regard to this, the averaging window size may be the same as the size of the FIFO memory 1100, that is, the number of correlation ratios, M. Thus, the same correlation values as those to be input into the buffer 1102 are also input into the FIFO memory 1100, and the FIFO memory 1100 accumulates a currently input correlation value to previously input correlation ratios. When the memory size of the FIFO memory 1100 is exceeded, the subtraction sign (−) is applied to the first input correlation ratio among the correlation ratios input into the FIFO memory 1100, and the input correlation ratios are delivered to the summator 1101. In this way, the summator 1101 sums only the latest input M correlation ratios, and the summation of the latest input M correlation ratios is delivered to the buffer 1102.

Subsequently, when the buffer 1102 is filled with the summation of correlation ratios, the number of which corresponds to M, it outputs the summation to the divider 1103. With regard to this, the counter 1104 connected to the buffer 1102 counts the number of the correlation ratios, the summation of which is filled in the buffer 1102, and delivers the number of the correlation ratios to the divider 1103 when the number of the correlation ratios becomes M. Then, the divider 1103 determines the average value of the correlation ratios by multiplying the summation of the correlation ratios, input from the buffer 1102, by 1/M, and outputs the determined average value.

If the average value of the correlation ratios is output from the divider 1103, then the counter 1104 sets the number of correlation ratios filled in the buffer 1102 to M−1, and awaits a next correlation ratio to be input into the buffer 1102. The average value of correlation ratios, determined as described above, is delivered to the Bessel function approximator 523.

Assuming that the average value of correlation ratios is expressed by Equation (7), the Bessel function approximator 523 expresses the average value of correlation ratios by means of the Bessel function, as given in the following equation:

$$\rho(\tau) = J_0(2\pi f_{app}\tau) \tag{8}$$

where, $J_0$ denotes the zero-order Bessel function of the first kind, $\rho(\tau)$ denotes the average value of correlation ratios, expressed using the Bessel function, and t denotes the replacement value of $mT_s$. Then, the Bessel function approximator 523 determines the reference Doppler value $f_{app}$ by approximating the average value of correlation ratios, $\rho(\tau)$, by using the inverse function of the Bessel function, as given in the following equation:

$$f_{app} = \frac{1}{2\pi\tau} J_0^{-1}(\rho(\tau)) \tag{9}$$

where, $J_0^{-1}$ denotes the inverse function of the zero-order Bessel function of the first kind.

The Bessel function approximator 523 outputs the reference Doppler value $f_{app}$ to the piecewise mapper 530. In addition to the reference Doppler value, the Bessel function approximator 523 directly determines an index indicating a limit value for limiting the maximum allowable Doppler shift or obtains the index through the lookup table 525, and outputs the index to the piecewise mapper 530. As an example, the index i is mapped to the average value of correlation ratios between symbols with data allocated thereto, that is, the value of $\rho(\tau)$, the value of the inverse Bessel function into which the value of $\rho(\tau)$ is input, that is, the value of $J_0^{-1}(\rho(\tau))$, and the value of $2\pi F_{d,ref} i$, which are configured as illustrated in FIG. 12.

Figure 12:
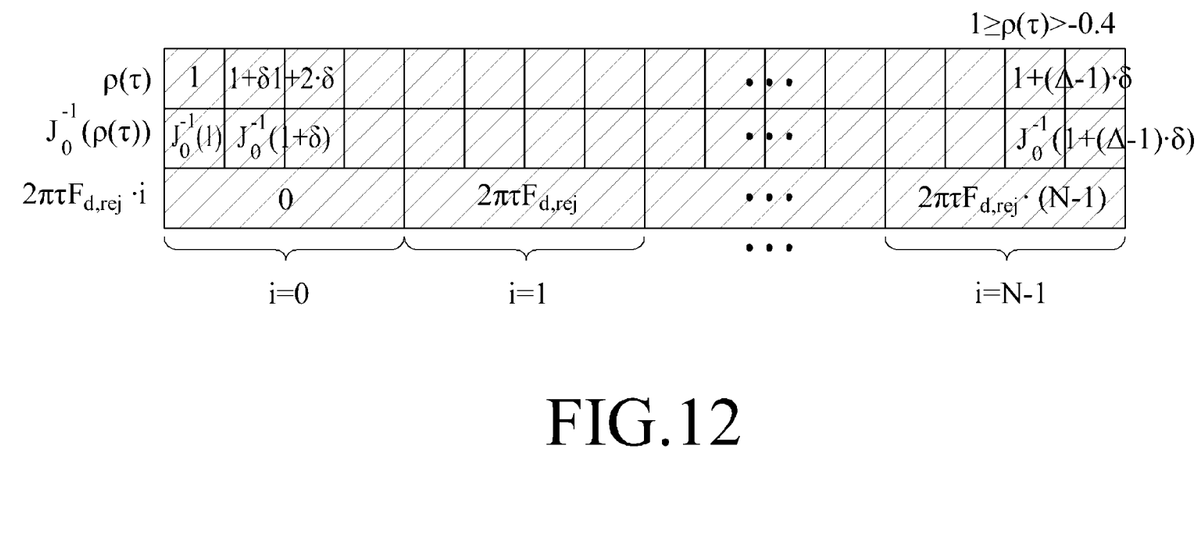
FIG. 12 illustrates a lookup table according to an exemplary embodiment of the present invention.

FIG. 12 illustrates a lookup table according to an exemplary embodiment of the present invention.

Referring to FIG. 12, the value of $\rho(\tau)$, the value of $J_0^{-1}(\rho(\tau))$, and the value of $2\pi F_{d,ref} i$ exist on the ordinate axis, and $\rho(\tau)$ values from 1 to $(1+(\Delta-1)\cdot\delta)$ are plotted on the abscissa axis corresponding to the value of $\rho(\tau)$, and $J_0^{-1}(\rho(\tau))$ values for 1 to $(1+(\Delta-1)\cdot\delta)$ are also plotted on the abscissa axis corresponding to the value of $J_0^{-1}(\rho(\tau))$. Finally, $2\pi F_{d,ref} i$ values corresponding to the index i are plotted on the abscissa axis corresponding to the value of $2\pi F_{d,ref} i$. Here, $\delta$ is represented by $\delta = (\rho_{max}(\tau) - \rho_{min}(\tau))/N$, and has an influence on the resolution of the lookup table. Also, $F_{d,ref}$ denotes a folding frequency indicating the frequency position where the folding effect between estimated and true velocities is caused by aliasing when the condition of the sampling theory, expressed by Equation (11) as given below, is not satisfied.

The index i may be defined as indexes of frequency-domain intervals having a spacing of the folding frequency, in which the Doppler shift $f_{psd}$ determined in the PSD searcher 510 is to be compensated for a folding value representing a difference between the estimated and true velocities of a mobile station.

More specially, the index i is determined according to the result of a comparison between $\rho(\tau)$ and $2\pi F_{d,ref} \cdot i$. The index i is set to 0 if $\rho(\tau)$ has a value of less than $2\pi F_{d,ref} \cdot 1$, and is set to 1 if $\rho(\tau)$ has a value of less than $2\pi F_{d,ref} \cdot 2$. In the same manner, the index i is set to N−2 if $\rho(\tau)$ has a value of less than $2\pi F_{d,ref} \cdot (N-1)$, and is set to N−1 if $\rho(\tau)$ has a value of $2\pi F_{d,ref} \cdot (N-1)$ or greater.

In spite of obtaining the values mapped to the index i from values pre-stored in the lookup table 525, the Bessel function approximator 523 may set the mapped values in a similar manner as in FIG. 12 according to the result of a comparison between $\rho(\tau)$ and $2\pi F_{d,ref} \cdot i$, and outputs the set values to the piecewise mapper 530.

Finally, when $f_{app}$ falls within any one of folding intervals determined according to the folding frequency, the piecewise mapper 530 compensates $f_{psd}$ by using Equation (10) as given below. In Equation (10), the folding frequency $F_{d,ref}$ is determined by Equation (11) using the period of preamble signals, $T_p$, according to the sampling theory. If the piecewise mapper 530 receives an index i from the Bessel function approximator 523, then it determines Equation (10) by using the received index i.

$$f_{est} = F_{d,ref} \cdot i + F_{d,ref} \cdot (i\%2) + (-1)^i \cdot f_{psd}, \; (i \mid F_{d,ref} \cdot i \le f_{app} < F_{d,ref} \cdot (i+1), i=0, 1, \ldots, N-1) \quad (10)$$

where, N denotes the maximum value of the index i for limiting the maximum allowable Doppler shift, which may be set by the user or designer.

$$F_{d,ref} = \frac{1}{2T_p} \quad (11)$$

Figure 13:
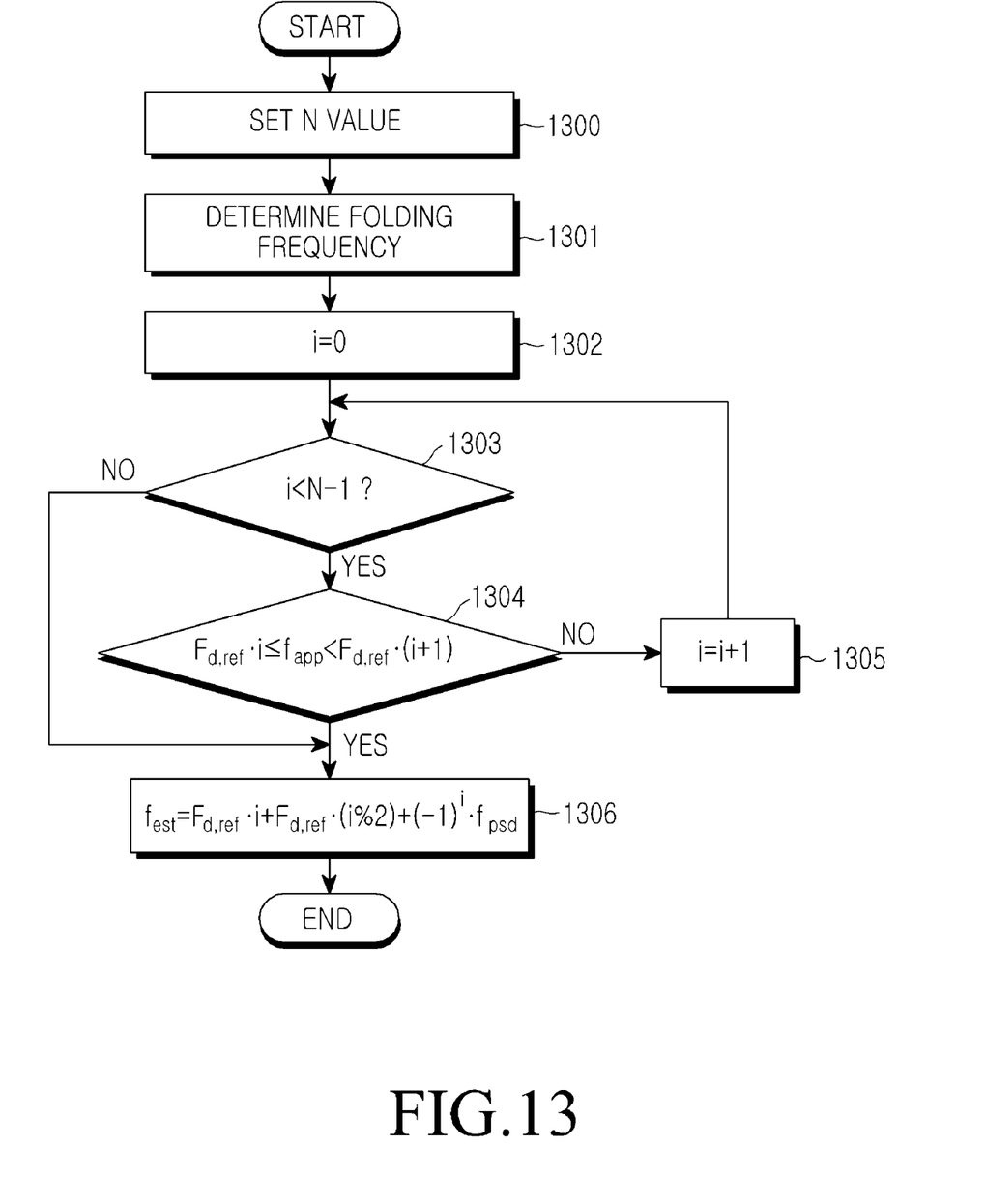
FIG. 13 is a flowchart illustrating an operation of a piecewise mapper according to an exemplary embodiment of the present invention.

When the piecewise mapper 530 does not receive an index i from the Bessel function approximator 523, it sets the maximum value of an index i, and performs an operation of FIG. 13 until i reaches its maximum value.

FIG. 13 is a flowchart illustrating an operation of a piecewise mapper according to an exemplary embodiment of the present invention. In an exemplary implementation, the piecewise mapper repeats this compensation operation a maximum of predetermined N times, and compares the compensation results, thereby detecting the folding interval index and compensating the estimated velocity.

Referring to FIG. 13, in step 1300, the piecewise mapper 530 sets the maximum value of the limit value. In step 1301, the piecewise mapper 530 determines the folding frequency $F_{d,ref}$ according to Equation (11) by using the period of preamble signals, $T_p$, and then proceeds to a compensation operation.

That is, in step 1302, the piecewise mapper 530 sets the identifier i of the limit value for the maximum allowable Doppler shift to 0. In step 1303, the piecewise mapper 530 identifies the value of i, and determines if i is less than N−1. If it is determined in step 1303 that i is less than N−1, then the piecewise mapper 530 determines in step 1304 if the reference Doppler value $f_{app}$ falls within the folding interval determined using the identified value of i and $F_{d,ref}$, that is, if $F_{d,ref} \cdot i \le f_{app} < F_{d,ref} \cdot (i+1)$ is satisfied. When it is determined in step 1304 that $f_{app}$ falls within the folding interval, the piecewise mapper 530 proceeds to step 1306 and determines $f_{est}$ according to Equation (10) by which the Doppler shift $f_{psd}$ is compensated for a portion where the folding effect of the estimated velocity occurs, and outputs the determined $f_{est}$.

Subsequently, the piecewise mapper 530 estimates the velocity of the mobile station by using the compensated $f_{est}$.

If it is determined in step 1304 that $f_{app}$ does not fall within the folding interval, the piecewise mapper 530 increases i by 1 in step 1305, and repeats steps 1303 to 1305.

If it is determined in step 1303 that i is equal to or greater than N−1, then the piecewise mapper 530 proceeds to step 1305.

As described above, up to N times corresponding to the limit value predetermined by a user, the Doppler shift $f_{psd}$ is compensated for a portion where the folding effect occurs in an estimated velocity, by using Equation (10), and the velocity of a mobile station is estimated using the compensated frequency $f_{est}$, so that an estimated velocity close to the true velocity can be obtained.

Figure 4:
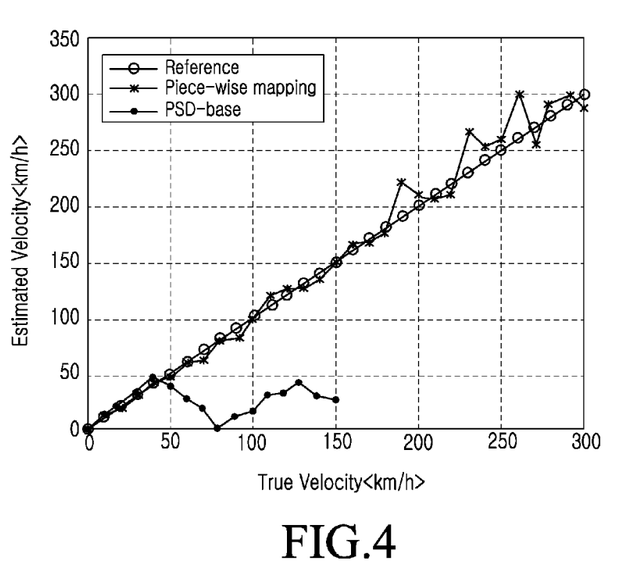
FIG. 4 is a graph illustrating velocity estimation performance according to an exemplary embodiment of the present invention in comparison with typical velocity estimation performance.

FIG. 4 is a graph illustrating velocity estimation performance according to an exemplary embodiment of the present invention in comparison with typical velocity estimation performance.

Referring to FIG. 4, the folding effect between estimated and true velocities is caused by aliasing in the typical velocity estimation performance. In contrast to this, the velocity estimation performance according to the present invention shows almost no difference between estimated and true velocities because a portion where aliasing occurs is estimated and compensated.

According to exemplary embodiments of the present invention as described above, velocity estimation performance is improved over the prior art by detecting a frequency position where aliasing occurs in a power spectrum and compensating a frequency interval, in which the folding effect occurs in the Doppler shift, by using a reference Doppler value obtained through correlation ratios between symbols to which data are allocated according to subcarriers. Further, through this, estimatable ranges, that is, folding intervals, are obtained, and thus the velocity of a mobile station can be estimated as close to the true velocity as possible.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. An apparatus for recovering an estimated velocity of a mobile station in a communication system, the apparatus comprising:
   a searcher for determining a Doppler shift value representing the estimated velocity of the mobile station by using a channel impulse response of a preamble signal received at a regular interval of time;
   a detector for determining a reference Doppler value for compensating the Doppler shift value by using correlation ratios between channel values of symbols to which data for the mobile station are allocated according to subcarriers in a data allocation field of a frame including the preamble signal; and
   a compensator for determining a compensated Doppler shift value by using the reference Doppler value to compensate the Doppler shift value for a folding value,
   wherein the folding value represents a difference between the estimated velocity and a true velocity of the mobile station,
   wherein the compensator sets a maximum value representing a maximum allowable value of the Doppler shift value, determines a folding frequency representing a frequency position where aliasing occurs, determines frequency-domain folding intervals having a spacing of the folding frequency, in which the Doppler shift value is to be compensated for the folding value within a range up to the maximum value, determines if the reference Doppler value falls within each of the folding intervals, and if the reference Doppler value falls within a corresponding folding interval, determines the compensated Doppler shift value by using the folding frequency, an index of the corresponding folding interval, and the Doppler shift value, and wherein each of the folding intervals represents an interval that is equal to or greater than the folding frequency times the index of the corresponding folding and is less than the folding frequency times the index plus 1, and the folding frequency is determined as a reciprocal number of two times the regular interval of time.

2. The apparatus as claimed in claim 1, wherein the compensated Doppler shift value is determined according to the following equation:

$$f_{est}=F_{d,ref}i+F_{d,ref}(i\%2)+(-1)^i\cdot f_{psd}, (i\backslash F_{d,ref}i \leq f_{app} < F_{d,ref}(i+1), i=0,1,\ldots,N-1)$$

where, $f_{est}$ denotes the compensated Doppler shift value, i denotes the index, N denotes the maximum value, and $F_{d,ref}$ denotes the folding frequency.

3. The apparatus as claimed in claim 1, wherein the detector comprises:

a correlator for determining each of the correlation ratios between the channel values of the symbols to which the data are allocated according to the subcarriers;

an averager for determining a first average value of the correlation values output from the correlator; and an approximator for determining an approximate value by approximating the first average value by using a Bessel function, and outputting the determined approximate value as the reference Doppler value.

4. The apparatus as claimed in claim 3, wherein the correlator obtains frequency-domain channel values for the respective symbols to which the data are allocated according to the subcarriers, averages values corresponding to a channel value of a reference symbol times the respective channel values of symbols other than the reference symbol to thereby obtain a second average value, and determines each of the correlation ratios by dividing the second average value by a third average value that is obtained by averaging a square of the channel value of the reference symbol.

5. The apparatus as claimed in claim 3, wherein, in order to minimize a variation in the Doppler shift value, the correlation values, the number of which corresponds to a predetermined averaging window size, are input into the averager, the averager determines an average value of the input correlation ratios, and the correlation ratios, the number of which corresponds to the averaging window size, are determined in order from the last input correlation ratio to the first input correlation ratio.

6. The apparatus as claimed in claim 1, further comprising a lookup table for storing index values of frequency-domain folding intervals having a spacing of a folding frequency, in which the Doppler shift value is to be compensated for the folding value within a range up to the maximum value, the folding frequency representing a frequency position where aliasing occurs, the correlation ratios mapped to each of the index values of the folding intervals, inverse Bessel function values of the respective correlation values, and $2\pi$ times the folding frequency times the indexes of the folding intervals.

7. The apparatus as claimed in claim 1, wherein the reference Doppler value is determined according to the following equation:

$$f_{app} = \frac{1}{2\pi\tau}J_0^{-1}(\rho(\tau))$$

where, $J_0$ denotes the zero-order Bessel function of a first kind, $\rho(\tau)$ denotes an average value of correlation ratios, expressed using the Bessel function, and $\tau$ denotes a replacement value of $mT_s$, m denotes the number of symbols, which corresponds to a distance between symbols (inter-symbol distance) to which data are allocated in a corresponding effective subcarrier, $T_s$ denotes an Orthogonal Frequency Division Multiplexing (OFDM) symbol period.

8. A method of recovering an estimated velocity of a mobile station in a communication system, the method comprising:

determining a Doppler shift value representing the estimated velocity of the mobile station by using a channel impulse response of a preamble signal received at a regular interval of time;

determining a reference Doppler value for compensating the Doppler shift value by using correlation ratios between channel values of symbols to which data for the mobile station are allocated according to subcarriers in a data allocation field of a frame including the preamble signal; and determining a compensated Doppler shift value by using the reference Doppler value to compensate the Doppler shift value for a folding value, wherein the folding value represents a difference between the estimated velocity and a true velocity of the mobile station, wherein the determining of the compensated Doppler shift value comprises:

setting a maximum value representing a maximum allowable value of the Doppler shift value;

determining a folding frequency representing a frequency position where aliasing occurs;

determining frequency-domain folding intervals having a spacing of the folding frequency, in which the Doppler shift value is to be compensated for the folding value within a range up to the maximum value; and determining if the reference Doppler value falls within each of the folding intervals, and, if the reference Doppler value falls within a corresponding folding interval, determining the compensated Doppler shift value by using the folding frequency, an index of the corresponding folding interval, and the Doppler shift value, and wherein each of the folding intervals represents an interval that is equal to or greater than the folding frequency times the index of the corresponding folding and is less than the folding frequency times the index plus 1, and the folding frequency is determined as a reciprocal number of two times the regular interval of time.

9. The method as claimed in claim 8, wherein the compensated Doppler shift value is determined according to the following equation:

$$f_{est}=F_{d,ref}i+F_{d,ref}(i\%2)+(-1)^i\cdot f_{psd}, (i\backslash F_{d,ref}i \leq f_{app} < F_{d,ref}(i+1), i=0,1,\ldots,N-1)$$

where, $f_{est}$ denotes the compensated Doppler shift value, i denotes the index, N denotes the maximum value, and $F_{d,ref}$ denotes the folding frequency.

10. The method as claimed in claim 8, wherein the determining of the reference Doppler value comprises:
- determining each of the correlation ratios between the channel values of the symbols to which the data are allocated according to the subcarriers;
- determining a first average value of the determined correlation values; and
- determining an approximate value by approximating the first average value by using a Bessel function, and outputting the determined approximate value as the reference Doppler value.

11. The method as claimed in claim 10, wherein the determining of each of the correlation ratios comprises:
- obtaining frequency-domain channel values for the respective symbols to which the data are allocated according to the subcarriers;
- averaging values corresponding to a channel value of a reference symbol times the respective channel values of symbols other than the reference symbol to thereby obtain a second average value; and
- determining each of the correlation ratios by dividing the second average value by a third average value that is obtained by averaging a square of the channel value of the reference symbol.

12. The method as claimed in claim 10, wherein, in order to minimize a variation in the Doppler shift value, the determining of the first average value comprises:
- inputting the correlation values, the number of which corresponds to a predetermined averaging window size; and
- determining an average value of the input correlation ratios,
- wherein the correlation ratios, the number of which corresponds to the averaging window size, are determined in order from the last input correlation ratio to the first input correlation ratio.

13. The method as claimed in claim 8, wherein the reference Doppler value is determined according to the following equation:

$$f_{app} = \frac{1}{2\pi\tau} J_0^{-1}(\rho(\tau))$$

where, $J_0$ denotes the zero-order Bessel function of a first kind, $\rho(\tau)$ denotes an average value of correlation ratios, expressed using the Bessel function, and $\tau$ denotes a replacement value of $mT_s$, m denotes the number of symbols, which corresponds to a distance between symbols (inter-symbol distance) to which data are allocated in a corresponding effective subcarrier, $T_s$ denotes an Orthogonal Frequency Division Multiplexing (OFDM) symbol period.

* * * * *